Patented June 15, 1954

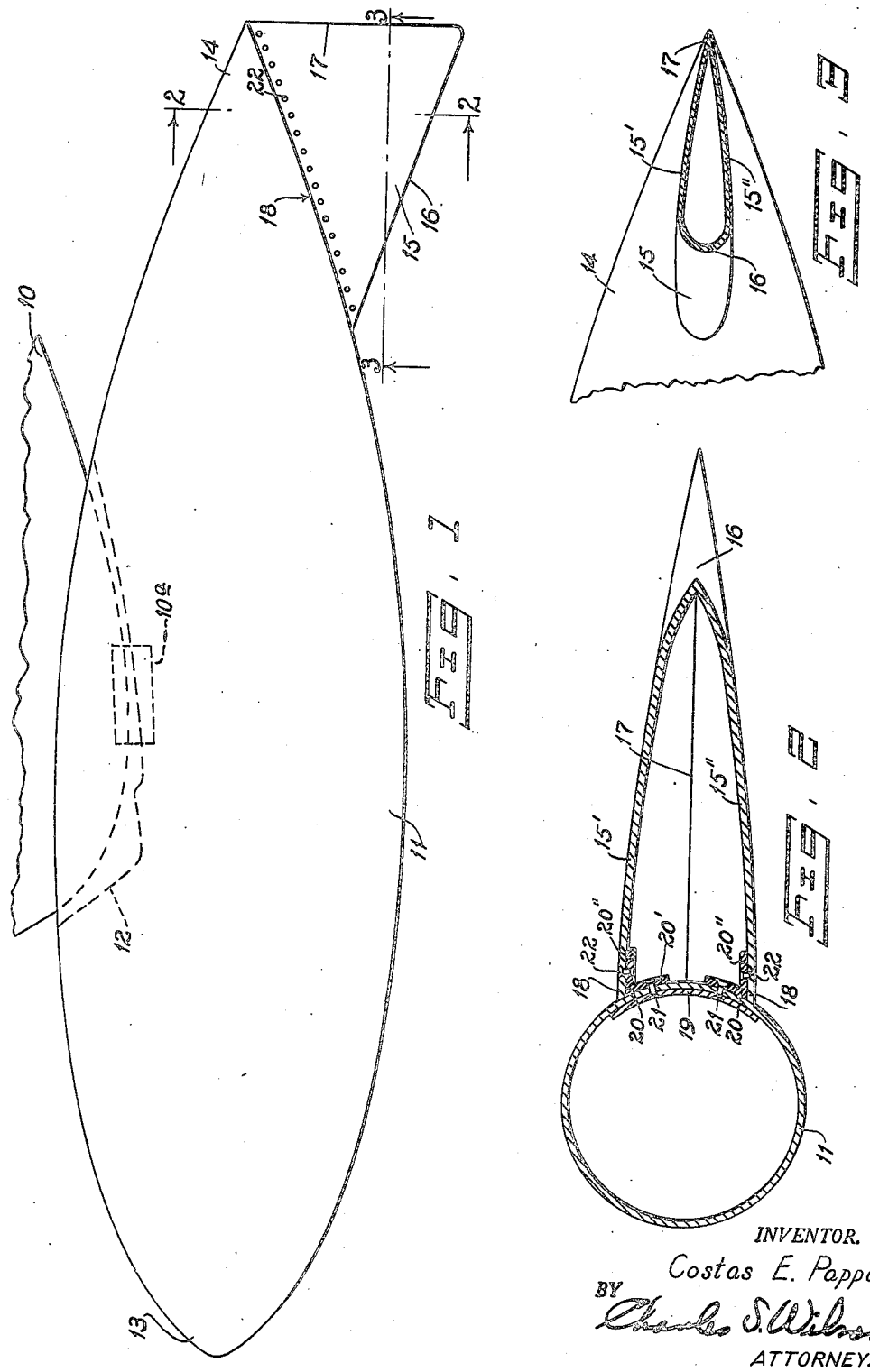

2,681,192

UNITED STATES PATENT OFFICE 2,681,192

WING TIP TANK CONSTRUCTION

Costas E. Pappas, Huntington, N. Y., assignor to Republic Aviation Corporation, Farmingdale, N. Y., a corporation of Delaware Application April 7, 1950, Serial No. 154,487

6 Claims. (Cl. 244—135)

This invention relates generally to bodies having aerodynamic shapes or contours, such as fuel cells or tanks, which are to be externally mounted on, or are to be carried by, a component of an airplane, such as a wing, and has for one of its objects the provision of means to counteract or prevent any adverse effect on the stability of the airplane, or of a component thereof, that may be occasioned by, or result from, so mounting such a body thereon.

Primarily the instant invention is concerned with the installation or mounting of tanks having aerodynamic shapes or contours at, or immediately adjoining, the outboard ends or tips of the wings of an airplane and proposes to incorporate in, or associated with, the tank structure means that will aerodynamically react with the airstream to stabilize the tank relatively to the wing and prevent it from adversely affecting the stability not only of the wing to which it is attached but that of the airplane as well.

With the above and other objects in view this invention consists in the construction, combination and arrangement of parts, all as hereinafter more fully described, claimed and illustrated in the drawings wherein:

Fig. 1 is a plan view of a tank, embodying the present invention, showing it in association with, or mounted on, the tip of an airplane wing;

Fig. 2 is a transverse section taken through the aft end of the tank along line 2—2 of Fig. 1; and Fig. 3 is a section taken along line 3—3 of Fig. 1 to illustrate the aerodynamic shape or profile of the fin associated with or carried by the aft end of the tank as taught by this invention.

To increase the range or radius of action of an airplane it has become more or less common practice to mount external fuel tanks on various components of the airplane and this means of increasing operational range is particularly useful in military aircraft. These tanks on occasion have been mounted under the fuselage, but more generally have been mounted under the wings inboard of the wing tips and not infrequently nearer to the root ends of the wings than to their tips. Recently it has been found more practical and desirable to mount such auxiliary or external fuel tanks at the wing tips. In some instances, the tank has been mounted immediately under the wing tip while in others it has been mounted at and surrounding or embracing the wing tip, and in either case so positioning the tank develops problems of stability in relation not only to the wing but also relative to the overall stability of the airplane. It is to the correction of these unstable conditions occasioned by the mounting of a tank at or on a wing tip that the present invention is addressed.

When a tank or other body is mounted on, or carried at the end or tip of an airplane wing, whether immediately under or surrounding or embracing the wing tip, it has been found that in maneuvers involving changes in attitude of the airplane, such as in climb or descent, the nose or forebody of the tank tends to continue any displacing movement resulting from a change in the angle of attack or of the attitude of the airplane and necessarily of its wings. Thus a tank situated at a wing tip is, or becomes, an unstable body, since, when displaced, it tends to continue its displacing movement rather than tends to return to its original or neutral position upon the discontinuance of the displacing moment; as would be the case with a stable body.

In short, the nose of a tank during maneuvers tends to continue any movement, either up or down, resulting from a change in the angle of attack or attitude of the airplane after this change has been completed. This tendency on the part of the tank causes the wing to twist or distort and this twisting of the wing destroys or greatly reduces the stability of the wing and of the airplane. When the tank is full the resulting twisting movement of the wing is present but is of less magnitude.

It is recognized that an unstable body of revolution tends to continue its angular displacement from neutral; thus if the angle of attack of the body is increased or decreased, the body tends to continue such increase or decrease rather than return to its original position as would be the case were it an entirely stable body. A wing tip tank is an unstable body of revolution and, due to its position, as the angle of attack of the airplane is changed the tank tends to continue its movement caused by such change, or to amplify the degree of change, with the result that the wing is twisted and distorted, sometimes to the point of disintegration. The tank thus being an unstable body contributes appreciably to the instability of the entire airplane.

The present invention proposes to aerodynamically overcome the instability of a tank situated at the tip of a wing by incorporating a fin on the outboard side or surface of the tank, which in and of itself constitutes a symmetrical airfoil fixedly secured to the tank, and preferably having a contour or profile of the same order as that of the wing that carries the tank. This fin is positioned substantially in the plane of the wing carrying the tank, or parallel thereto, and being outboard of the extremity of the wing is not noticeably affected by the turbulence of air spilling or flowing off the wing.

The placing of a fin on the outboard surface of a tip tank serves two purposes. First, it eliminates the instability which would occur with a tank not having a fin. The aerodynamic stability resulting from mounting a tank with a fin at the tip of the wing permits the pilot to more easily change the attitude of the airplane. Thus, as an airplane having neutral stability requires practically no stick force on the part of the pilot to effect a maneuver, so may the pilot easily overcontrol the airplane during a maneuver and this results in excessive load factors on the airplane. By incorporating a fin on the tank as aforesaid, the unstable moments of the basic body can not only be reduced, but the body itself can be made stable. Thus the overall stability of the airplane can be increased. Second, the installation of a fin as aforesaid reduces the twist and distortion of the wing since the unstable aerodynamic moments can be reduced materially, if not eliminated, by the use of the fin. By aerodynamic moment, as herein used, is meant the tendency of the wing tip tank to rotate on its point of attachment to the wing tip due to the pressure distribution of air loads on the tank itself. The wing reacts to this aerodynamic movement thereby introducing a twist or distortion in the wing.

Reference being had more particularly to the drawings, 10 designates the tip of an airplane wing with which a fuel tank 11 is associated by having the wing tip 10 received in a pocket or recess 12 formed in the inboard surface or wall of the tank. In most installations the nose 13 of the tank is situated forward of the center of gravity of the airplane while the aft end 14 thereof is positioned aft thereof. Any suitable means 10a is employed to attach the tank 11 to the wing tip 10 but since this means forms no part of the instant invention it is shown schematically in Fig. 1. It is sufficient to note that the tank 11 is attached to the wing 10 by any suitable means 10a located within the confines of the pocket or recess 12.

The present invention resides in fixedly mounting a fin 15 at the aft end of the tank 11 on the outboard surface thereof, i. e., in opposition to the wing tip 10. This fin 15 may be of any adaptable construction and preferably consists of a metal sheet bent upon itself to create the leading edge 16, the trailing edge 17, the upper surface 15' and lower surface 15". In the illustrated adaptation of this invention the surfaces 15' and 15" of the fin 15 converge rearwardly to where two of the edges of the sheet forming the fin 15 are superposed and secured together to constitute the trailing edge 17. The profile (Fig. 3) of the fin 15 is a true airfoil and while this is not an essential requirement, it is preferred that it be of the same order as the profile of wing 10 to which the tank 11 is to be attached.

This fin 15 is mounted on or against the outboard surface of the aft end 14 of the tank 11 with its trailing edge 17 normal to the longitudinal axis of the tank and in transverse alignment with the rear or aft extremity of the tank. When the fin is so positioned the leading edge 16 thereof slopes outwardly and aftwardly from a point on the outboard surface of the tank 11 forward of the rear or aft extremity thereof to the outer end of the trailing edge 17. Adjacent the tank 11 the inner edges 18 of the upper and lower surfaces 15' and 15" (Fig. 2) of the fin 15 are superposed and spaced one from the other and are arranged to abut flush against the outboard surface of the tank throughout their length, i. e., from the rear extremity of the tank to the inner or forward extremity of the leading edge 16.

These edges 18 may be fixedly and rigidly secured to the tank in any manner and one example of this attachment is disclosed herein. A reinforcing plate 19, shaped to conform to the curvature of the tank wall, is placed flush against the inner face of the wall and is more than coextensive with the space defined by or between the edges 18 of the fin located against the outer surface of the tank wall at that point. Angle bars 20 positioned within the space defined by the upper surface 15' and lower surface 15" of the fin at and underlying the edges 18 thereof, have one arm 20' of each secured at spaced intervals to the wall of the tank and to the internal reinforcing plate 19 by any means, such as the rivets 21. The remaining arms 20" of the angle bars 20 underlie and rest flush against the inner faces of the edge portions 18 of the upper and lower surfaces 15' and 15" of the fin to be rigidly and fixedly secured thereto at spaced intervals by any suitable attaching means, such as the rivets 22.

It is evident that when the tank 15 is mounted on the wing tip 10 as shown in Fig. 1, the fin 15 being on the outboard side of the tank is thereby positioned appreciably outboard of the end of the wing. If the tank 11 is mounted directly under the wing tip 10, the fin 15 being associated with the outboard surface of the tank will be positioned and project beyond the wing tip. In either case the fin 15, being located beyond the wing tip 10, will not be affected by the turbulence of air spilling or flowing off the wing.

What is claimed is:

1. The combination with an elongated body having an aerodynamic contour and organized and arranged to be attached medially of its length to the outer end of the wing of an airplane, of a single fin comprising the sole stabilizing means on said body and having leading and trailing edges and the profile of an airfoil, fixedly secured to and projecting from the outboard side only of said body, with its trailing edge normal to the longitudinal axis of the body.

2. A tank having means at one side thereof adapted for mounting said tank to the tip of an airplane wing, said tank comprising a hollow body of aerodynamic contour, and a single fin comprising the sole stabilizing means on said tank and fixedly secured to the side of the body opposite to said mounting means to project outwardly therefrom.

3. A tank comprising an elongated body having means at one side thereof adapted for mounting said tank to the tip of an airplane wing, and a single fin comprising the sole stabilizing means on said tank and including a leading and a trailing edge, fixedly secured and to projecting from one end of said body at the outboard side only thereof with its trailing edge positioned normal to the longitudinal axis of the body and in transverse alignment with the aft extremity of the body.

4. A tank comprising an elongated body having means at one side thereof adapted for mounting said tank to the wing tip of an airplane and a single fin comprising the sole stabilizing means on said tank, including a leading and a trailing edge, fixedly secured to one end of the body at the outboard side only thereof with its trailing edge disposed normal to the longitudinal axis of the body and in transverse alignment with the aft extremity thereof and its leading edge angularly disposed between the wall of the body and the outer end of the trailing edge.

5. The combination with the wing of an airplane, of an aerodynamic body attached to the tip thereof, and a single fin comprising the sole stabilizing means on said body fixedly secured to and projecting from the aft end of said body and at the outboard side only of its longitudinal axis.

6. The combination with the wing of an airplane, of an aerodynamic body associated medially of its length with the tip thereof and a single fin comprising the sole stabilizing means on said body secured to and projecting from the aft end of the outboard side only of said body.

References Cited in the file of this patent

UNITED STATES PATENTS

| Number | Name | Date |
|---|---|---|
| 1,749,047 | St. Louis | Mar. 4, 1930 |
| 2,273,919 | Allward | Feb. 24, 1942 |
| 2,326,819 | Berlin | Aug. 17, 1943 |
| 2,417,342 | Bach | Mar. 11, 1947 |
| 2,537,369 | Astroff | Jan. 9, 1951 |

FOREIGN PATENTS

| Number | Country | Date |
|---|---|---|
| 606,088 | Great Britain | Aug. 5, 1948 |
| 872,789 | France | Feb. 23, 1942 |
| 923,549 | France | Feb. 24, 1947 |